(12) United States Patent
Choi

(10) Patent No.: US 10,606,087 B2
(45) Date of Patent: Mar. 31, 2020

(54) PORTABLE VIRTUAL REALITY DEVICE

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 15/712,393

(22) Filed: Sep. 22, 2017

(65) Prior Publication Data

US 2018/0011329 A1 Jan. 11, 2018

Related U.S. Application Data

(63) Continuation of application No. 14/982,696, filed on Dec. 29, 2015, now Pat. No. 9,804,401.

(30) Foreign Application Priority Data

Dec. 31, 2014 (KR) ........................ 10-2014-0195140

(51) Int. Cl.
G02B 27/02 (2006.01)
G02B 27/04 (2006.01)
G02B 27/01 (2006.01)
G02B 30/37 (2020.01)

(52) U.S. Cl.
CPC ......... G02B 27/04 (2013.01); G02B 27/0176 (2013.01); G02B 30/37 (2020.01); *G02B 2027/0136* (2013.01)

(58) Field of Classification Search
CPC .......... G02B 27/64; G02B 27/646–648; G02B 7/026; G02B 7/02; G02B 7/04; G02B 7/08; G02B 27/022; G02B 27/04; G02B 27/2257; G02B 27/0176; G02B 27/028; G02B 27/02; G02B 2027/0136; G03B 5/00–04; G03B 2205/00; G03B 2205/0007; G02C 5/006; G02C 5/08; G02C 5/2263; G02C 3/003; G02C 5/22
USPC .............................................. 359/480; 351/63
See application file for complete search history.

(56) References Cited

U.S. PATENT DOCUMENTS

| 2,621,562 | A | * | 12/1952 | Stone | ................. G02B 27/2257 |
| | | | | | 359/474 |
| 4,789,220 | A | | 12/1988 | Kinnard | |
| 5,058,990 | A | | 10/1991 | Bush | |
| 5,722,751 | A | | 3/1998 | Inaba | |
| 9,405,126 | B1 | * | 8/2016 | Margolin | ........... G02B 27/2257 |
| 2011/0234584 | A1 | | 9/2011 | Endo | |

(Continued)

FOREIGN PATENT DOCUMENTS

| CN | 2053193358 U | 4/2016 |
| CN | 205318026 U | 6/2016 |

(Continued)

*Primary Examiner* — Stephone B Allen
*Assistant Examiner* — Jyotsna V Dabbi
(74) *Attorney, Agent, or Firm* — Bacon & Thomas, PLLC

(57) ABSTRACT

A portable virtual reality device, which is provided with a board having a length to correspond to the focal distances of the left and right lens; a supporting board that is deployed and foldable based on the board; left and right lens plates that are deployed and folded left and rightward on a rear surface of the board based on the board. The smart phone is mounted simply to correspond to the focal distances of the left and right lens when it is used, and when it is carried, the left and right lens plates and the supporting board are folded to form a thin film to be carried conveniently.

1 Claim, 5 Drawing Sheets

(56) References Cited

U.S. PATENT DOCUMENTS

2014/0152531 A1* 6/2014 Murray ................ G06F 1/1632
345/8

FOREIGN PATENT DOCUMENTS

| GB | 2534538 A1 | 8/2016 |
|---|---|---|
| JP | 2011-154145 A | 8/2011 |

* cited by examiner

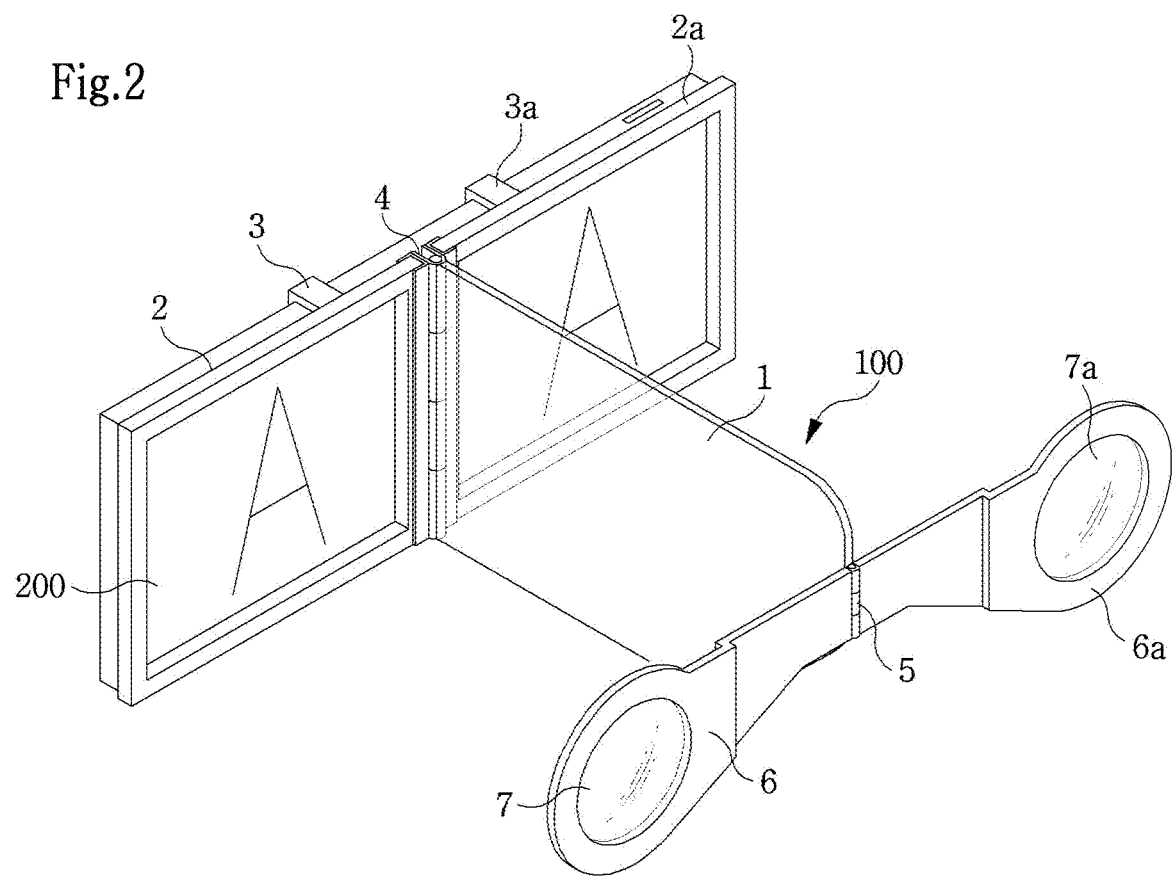

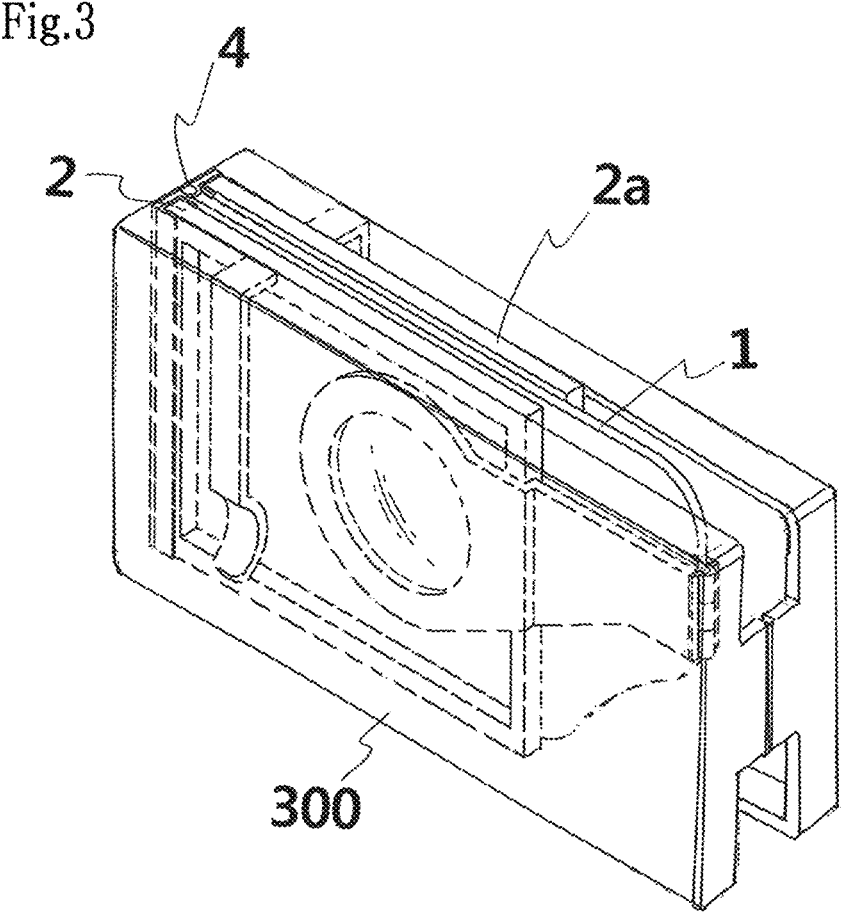

PORTABLE VIRTUAL REALITY DEVICE

CROSS-REFERENCE(S) TO RELATED APPLICATION

This application is a continuation application of U.S. application Ser. No. 14/982,696 filed Dec. 29, 2015 and granted as U.S. Pat. No. 9,804,401, which claims priority of Korean Patent Application No. 10-2014-0195140, filed on Dec. 31, 2014, in the Korean Intellectual Property Office, which are hereby incorporated by reference in their entirety.

BACKGROUND OF THE INVENTION

The present invention relates to a portable virtual reality device for experiencing virtual reality images by using a smart phone. Specially, the present invention relates to a portable virtual reality device for experiencing virtual reality images, which can be converted a thin film structure when folded such that the volume thereof is reduced by more than 1/40 times and the weight is lighted to more than 1/5 times compared with those of the existing portable virtual reality device. Accordingly, the portable virtual reality device of the present invention has features that it can be carried and used conveniently and the images thereof can be converted and adjusted easily at use.

A conventional virtual reality device using a smart phone has been supplied in a type as shown in FIG. 5, wherein for example, the volume thereof is expressed by 7 cm×14 cm×10 cm as width×length×thickness to consider as being large and the weight thereof reaches to 460 g so that it was too heavy to be portable and there were many limitation in use.

In addition, referring to the devices disclosed in Korean Patent Register Number 10-1388988 and US Patent Publication No. 2011/0234584, entitled "Head-Mounted Display Device", the volume is large and the weight is great so that they are inconvenient to carry and difficult to wear on a head for long times due to their volume and weight and further the manufacturing cost is high. Furthermore, since a smart phone is mounted in the device while it is used, the smart phone cannot be operated or the program of the smart phone cannot be changed while the device is used. Whenever it needs to change screens or programs of the smart phone, the smart phone has to be ejected one by one from the device and operated, causing inconvenience.

SUMMARY OF THE INVENTION

The present invention has been proposed to solve the drawback as described above and an aspect of the present invention is directed to a portable virtual reality device the volume of which is minimized and the weight of which is reduced remarkably, and which is used simply and carried conveniently.

A portable virtual reality device of the present invention includes; left and right supporting plates that are folded by diving the left and right fixing bars into two; left and right fixing bars on which the smart phones are mounted; left and right lens plates that are folded by being divided into two; and a board that is provided at the centers of the left and right lens plates and the left and right supporting plates and support the interval between the left and right lens plates and the left and right supporting plates.

The length of the board corresponds to the distance as much as the smart phone is disposed at the focal distances of the left and right lens.

A cover may be provided on the left and right fixing bars or rear surfaces thereof.

That is, the present invention relates to a portable virtual reality device, including; a board having a length to correspond to the focal distances of the left and right lens; left and right supporting boards that are deployed and folded left and rightward on a front surface of the board based on the board; left and right fixing bars which are provided on a rear surface of the left and right supporting boards and on which smart phones are arranged; and left and right lens plates that are deployed and folded left and rightward on a rear surface of the board based on the board, wherein the length of the board corresponds to the distance as much as the focal distances of the left and right lens reach to the surface of the smart phone when the portable virtual reality device is used, and it is folded to form a thin film when it is carried.

According to the present invention, the left and right supporting plates are deployed, the smart phones are mounted on the left and right fixing plates provided a rear surface of the left and right supporting plates and the lens plates at a rear surface of a board are deployed when the device is used. After using the device, the smart phones are separated from the left and right fixing bars, the left and right fixing bars and the left and right lens plates are folded thereby to be carried and kept simply.

Accordingly, when the smart phones are mounted on the left and right fixing bars, the left and right surfaces of the smart phone are exposed and thus the parts of the smart phones required for operation can be controlled while they are mounted.

Further, the length of the board is configured such that the focal distances of the left and right lens correspond to the distance of the smart phone so that the focal distances of the left and right lens correspond to the smart phones by only deploying the left and right lens plates to be used simply.

Since the supporting bar is disposed at a center of a picture of a smart phone, it blocks a phenomenon where the image is viewed in an overlapping manner as 3 or more due to a view angle of a viewer when the image is viewed with left and right eyes, allowing one 3D image to be viewed.

Further, when the portable virtual reality device is carried, the left and right lens plates and the left and right fixing bars are folded based on the board and thus the volume thereof is reduced to 1/40 at a maximum lever and the weight thereof is reduced remarkably to 1/4, comparing to a conventional VR device on which a smart phone is mounted as shown in FIG. 5, and thus the device is carried conveniently on a pocket.

Meanwhile, since the portable virtual reality device of the present invention is configured as a folding structure, the material cost is reduced remarkably to 1/4, thereby decreasing manufacturing cost, to be provided as a gift.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 2 is a perspective view of a portable virtual reality device into which a smart phone is mounted according to the present invention;

FIG. 3 is a perspective view of a case of a portable virtual reality device according to the present invention;

DETAILED DESCRIPTION OF THE INVENTION

Figure 1A:
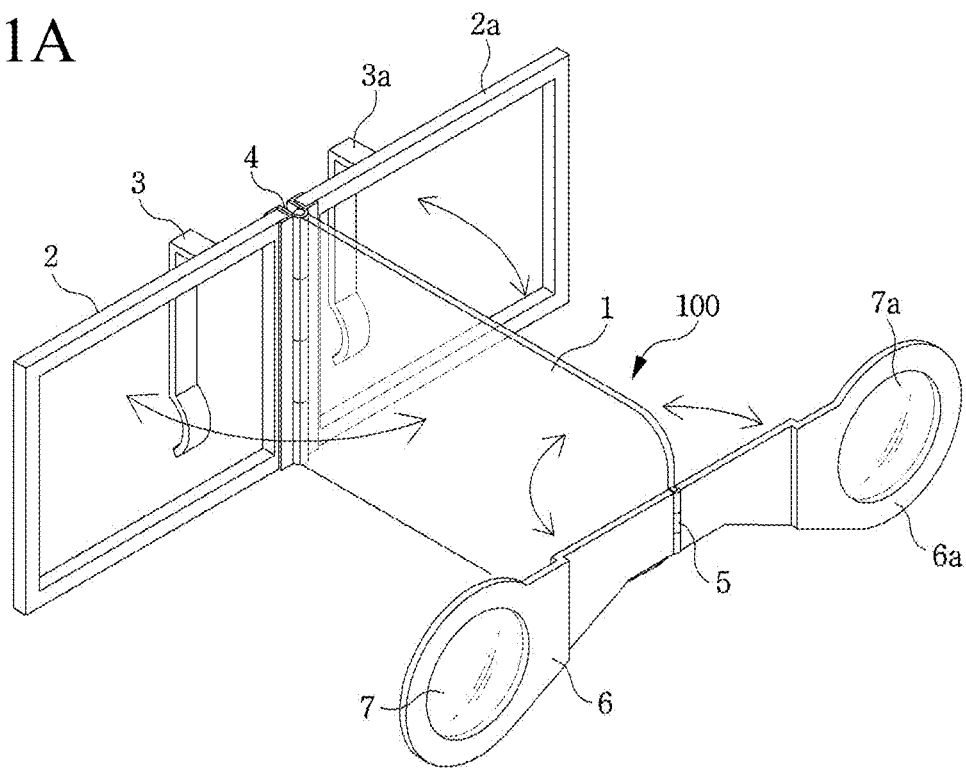
FIG. 1A is a perspective view of a portable virtual reality device according to the present invention.

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

As shown in FIG. 1A, the left and right supporting boards 2, 2a are supported by a hinge so as to be folded left and rightward by 90° based on a board 1 and the left and right fixing bars 3, 3a for fixing and separating a smart phone are provided on a rear surface of the left and right supporting boards 2, 2a.

The left and right lens plates 6,6a are provided on the rear end of the board 1 as in FIG. 1(*a*) and FIG. 1(*b*) to be folded left and rightward by 90° based on the hinge 5 of the board 1 and the left and right lens 7,7a are provided on the left and right lens plates 6,6a, respectively. Here, the length of the board 1 is configured to be identical to the focal distances of the left and right lens 7,7a such that the focal distances of the left and right lens to reach on the surface of smart phone 200 that is mounted on the left and right fixing bars 3, 3a.

According to the portable virtual reality device of the present invention, as shown in FIG. 2, the left and right supporting boards 2, 2a are deployed and the smart phones are mounted on the left and right fixing bars 3, 3a provided on a rear surface of the left and right supporting boards 2, 2a, and the left and right lens plate 6, 6a on a rear surface of the board 1 are deployed and the smart phones 200 and the left and right lens 7, 7a are arranged to be in parallel such that the focal distances of the left and right lens 7, 7a are adjusted automatically to the surfaces of the smart phones 200.

That is, the board 1 is disposed at a center and the length of the board is formed to correspond to the focal distances of the left and right lens 7, 7a such that the focal distances are adjusted automatically.

The reason that the board 1 is disposed at the centers of the left and right supporting boards 2, 2a and the left and right lens plates 6, 6a is because the left and right image of a smart phone correspond to an optical axis of the left and right lens 7, 7a such that a viewer views one 3D image.

Further, the board 1 is disposed at the centers of the left and right supporting boards 2, 2a and the left and right lens plates 6, 6a so that a boundary between the left and right images of a smart phone is blocked by the board 1, thereby avoiding plural images which are viewed as 2-3 images in accordance with view angles.

Meanwhile, since the left and right supporting boards 2, 2a is configured such that the surface of the smart phone is exposed, as shown in FIG. 2, a user can operate, change and drive a program while he/she views the images on the smart phone.

Figure 1B:
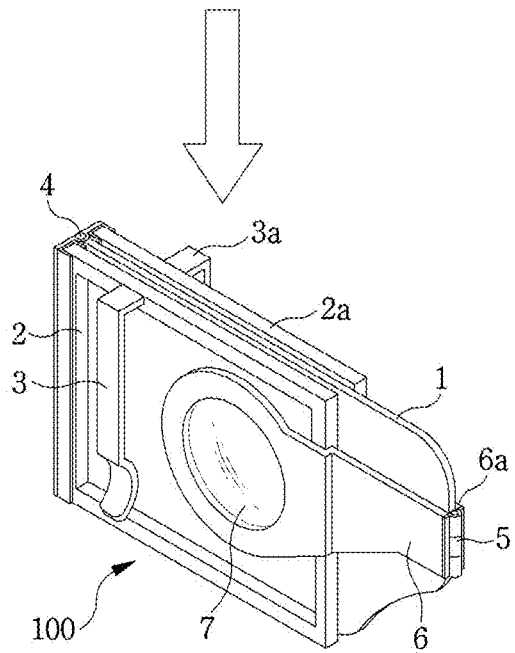
FIG. 1B is a perspective view of a portable virtual reality device while it is folded according to the present invention.
Figure 4:
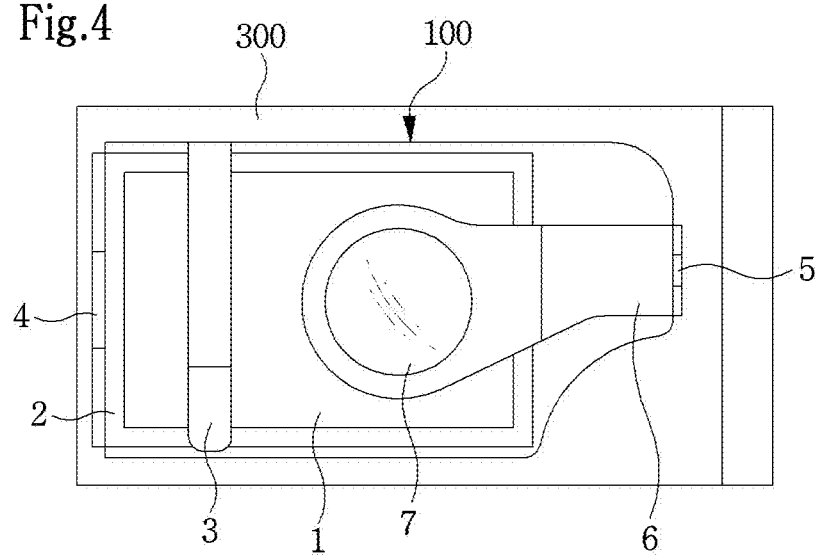
FIG. 4 is a perspective view of a portable virtual reality device mounted on a separate case according to the present invention.

The portable virtual reality device of the present invention may be folded to form a thin structure after using it as shown in FIG. 1B such that the left and right supporting boards 2, 2a are folded and then the left and right lens plates 6, 6a are folded, as shown in FIG. 1A and FIG. 1B.

Assuming that a focal distance of a magnifying lens is 6 cm, it showed from experiments that the volume of the portable virtual reality device using the same lens when it is folded is expressed by 7 cm×4 cm×1.5 cm as width×length×thickness to form a thin film of 42 cm$^3$, as shown in FIG. 1B. However, the volume of the conventional device, as shown in FIG. 5, reached to 2,040 cm$^3$ by 12 cm×17 cm×10 cm as width×length×thickness.

Figure 5:
FIG. 5 is a perspective view of a conventional VR.

That is, the volume of the portable virtual reality device of the present invention is reduced remarkably to the volume $\frac{1}{40}$ times as the volume of the conventional virtual reality device shown in FIG. 5.

The weight of the portable virtual reality device of the present invention also is reduced noticeably to 60 g by more than $\frac{1}{5}$ times as the weight of the conventional virtual reality device of 400 g.

Referring to the using method of the portable virtual reality device of the present invention, as shown in FIG. 2, the surface of the smart phone 200 is exposed inside the left and right supporting boards 2, 2a.

Accordingly, according to the portable virtual reality device of the present invention, the surface of the smart phone is controlled frequently such that a user may change pictures, programs and operating the pictures while he/she views VR pictures, differently from the conventional VR device shown in FIG. 5, in which the smart phone is separated to control the smart phone screen separately, and then the smart phone is again mounted.

Meanwhile, according to the present invention, an outer structure of the left and right supporting boards 2, 2a may be configured as a case type 300 as shown in FIG. 3, and when the main device 100 is embedded inside the case 300 when it is folded and carried, and the case 300 is deployed and the left and right supporting boards 2, 2a are deployed when it intends to use it.

Further, according to the present invention, the left and right fixing bars 3, 3a may be configured as the cases that are separated to the left and right parts, or as various disclosed structure proper for mounting the smart phone.

In addition, if necessary, a separate band may be provided on the board 1 or the left and right supporting boards 2, 2a to be arranged on a head of a user. In this case, the weight of the portable virtual reality device is light and thus it can be used for a long time. Accordingly, the portable virtual reality device of the present invention can be carried on a pocket since it can be folded to form a thin film.

Meanwhile, various disclosed hinges including a hinge that is deployed and fixed may be used for the hinges 4, 5.

Accordingly, when the portable virtual reality device of the present invention is used, the focal points of the pictures are corresponded, the smart phone 100 is mounted and separated simply, and it can be folded as a thin film thereby to reduce the volume and weight to be carried conveniently.

Further, the portable virtual reality device of the present invention can be used simply and the manufacturing cost is low, and a user can control the picture of a smart phone while viewing the picture.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A portable virtual reality device on which a smart phone, said portable virtual reality device consisting of:
   a single board formed in a way such that the single board is provided to extend in a forward direction at a center of left and right lens plates provided with the left and right lenses, wherein the single board has a length that has a same length as a focal distance of the left and right lenses at the center of left and right lenses;
   a hinge provided on a rear end of the single board, said hinge configured to connect said left and right lens plates together in a way such that the left and right lens plates are divided into two and are foldable in left and right directions towards left and right surfaces of the single board, said left and right lens plates housing said left and right lenses, wherein said hinge is formed from ends of left and right lens plates in a way such that the ends of the left and right lens plates are connected directly together;
   at least one fixing bar connected at a front end of the single board configured for mounting of a smart phone;
   wherein the portable virtual reality device is configured in a way such that when the device is in use, the left and right lens plates are unfolded from the left and right surfaces of the single board around the hinge so that the focal distance of the left and right lenses corresponds to the length of the single board, and
   wherein the device is configured to be carriable by having the left and right lens plates folded towards the left and right surfaces around the single board.

* * * * *